(12) United States Patent
Ehlers et al.

(10) Patent No.: US 8,651,420 B2
(45) Date of Patent: Feb. 18, 2014

(54) STOWAGE COMPARTMENT WITH SPACE-SAVING OPENING MECHANISM

(75) Inventors: Bernd Ehlers, Hamburg (DE); Mark Herzog, Barsbuettel (DE)

(73) Assignee: Airbus Operations GmbH, Hamburg (DE)

(*) Notice: Subject to any disclaimer, the term of this patent is extended or adjusted under 35 U.S.C. 154(b) by 486 days.

(21) Appl. No.: 12/729,934

(22) Filed: Mar. 23, 2010

(65) Prior Publication Data

US 2010/0243802 A1   Sep. 30, 2010

Related U.S. Application Data

(60) Provisional application No. 61/162,793, filed on Mar. 24, 2009.

(30) Foreign Application Priority Data

Mar. 24, 2009  (DE) .......................... 10 2009 014 605

(51) Int. Cl.
B64C 11/00   (2006.01)

(52) U.S. Cl.
USPC ................. 244/118.1; 244/129.5; 220/1.5

(58) Field of Classification Search
USPC ............... 244/129.5, 118.5, 129.4, 118.1; 220/1.5, 350

See application file for complete search history.

(56) References Cited

U.S. PATENT DOCUMENTS

| | | | |
|---|---|---|---|
| 4,428,491 A * | 1/1984 | Mittelmann et al. | 220/1.5 |
| 5,242,070 A * | 9/1993 | Bretschneider et al. | 220/1.5 |
| 5,938,149 A | 8/1999 | Terwesten | |
| 5,988,565 A * | 11/1999 | Thomas et al. | 244/118.1 |
| 6,547,184 B2 * | 4/2003 | Nieberle | 244/119 |
| 6,691,952 B2 * | 2/2004 | Keogh | 244/118.5 |
| 2005/0040288 A1 * | 2/2005 | Keogh | 244/118.5 |
| 2006/0284017 A1 | 12/2006 | Saint-Jalmes et al. | |

FOREIGN PATENT DOCUMENTS

| | | |
|---|---|---|
| DE | 4018362 A1 * | 12/1991 |
| DE | 20016405 U1 | 3/2002 |
| DE | 10224048 A1 | 12/2003 |
| DE | 102007030331 A1 | 1/2009 |
| FR | 2909941 A1 | 6/2008 |
| WO | 99/43545 A1 | 9/1999 |
| WO | 2009003945 A1 | 1/2009 |

* cited by examiner

*Primary Examiner* — Timothy D Collins
*Assistant Examiner* — Brian M O'Hara
(74) *Attorney, Agent, or Firm* — Ingrassia Fisher & Lorenz P.C.

(57) ABSTRACT

Overhead stowage compartments are provided for an aircraft. The stowage compartments feature an opening device that can be displaced or rolled up. This may make it possible to prevent lights or air outlets from being covered by pivoting a door upward, as well as to preserve the headroom during the opening process and to prevent collisions between the doors. The architecture of the aircraft may be optimized in this fashion.

16 Claims, 5 Drawing Sheets

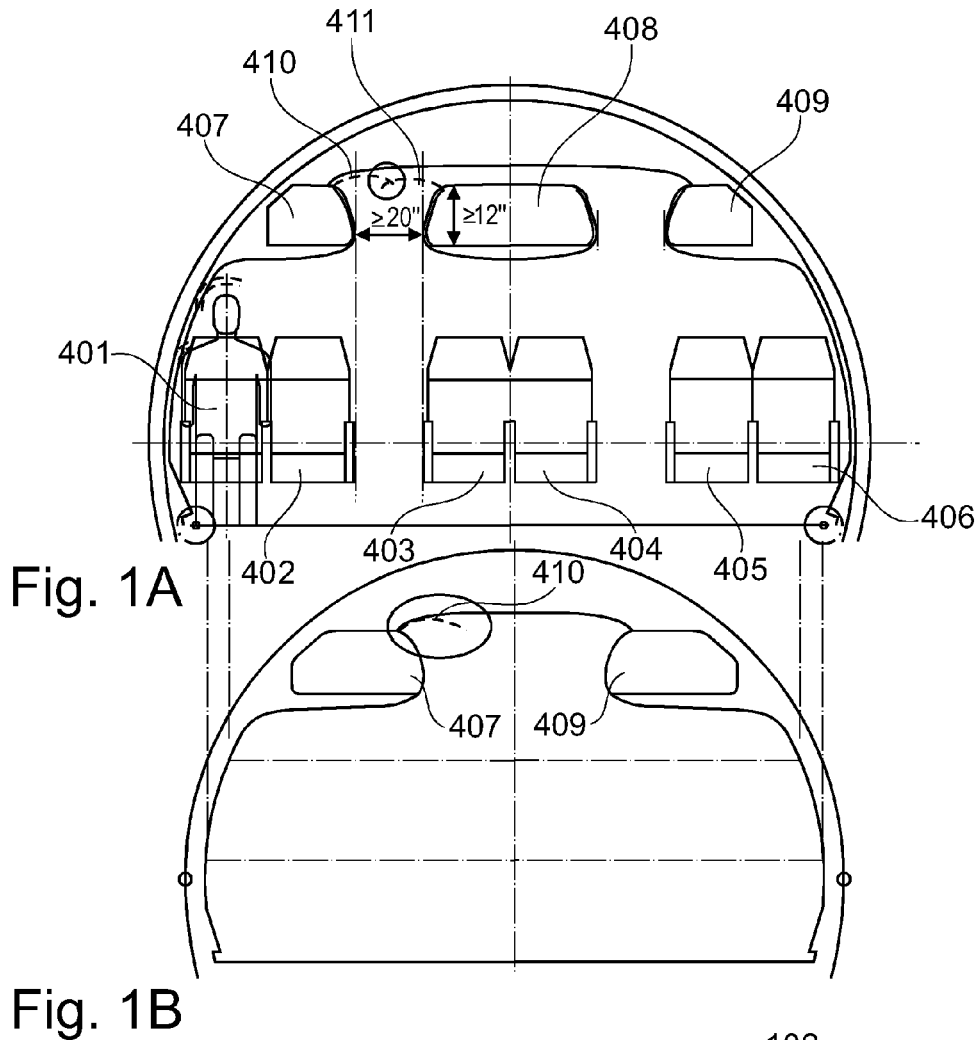
Fig. 1A
Fig. 1B
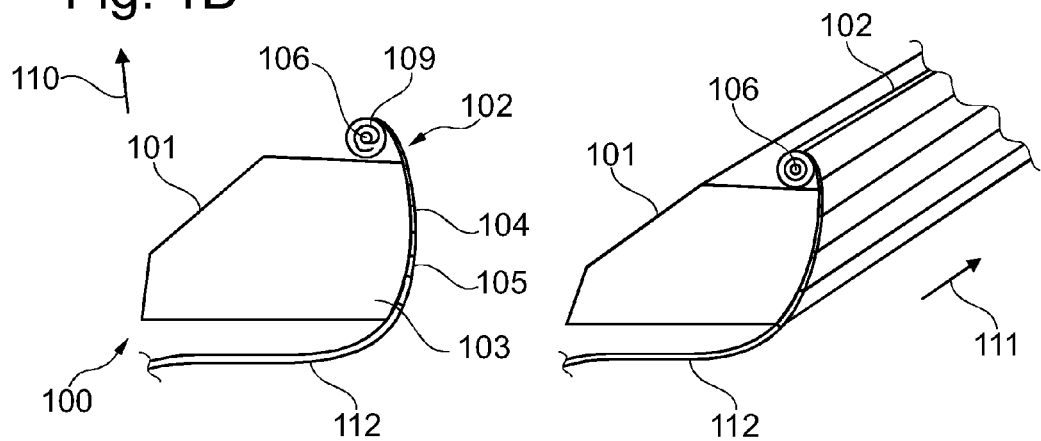
Fig. 2A
Fig. 2B

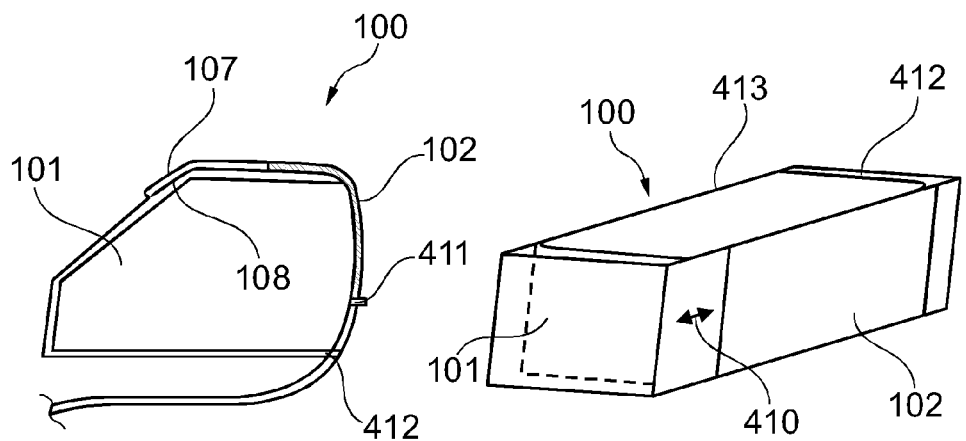
Fig. 3
Fig. 4
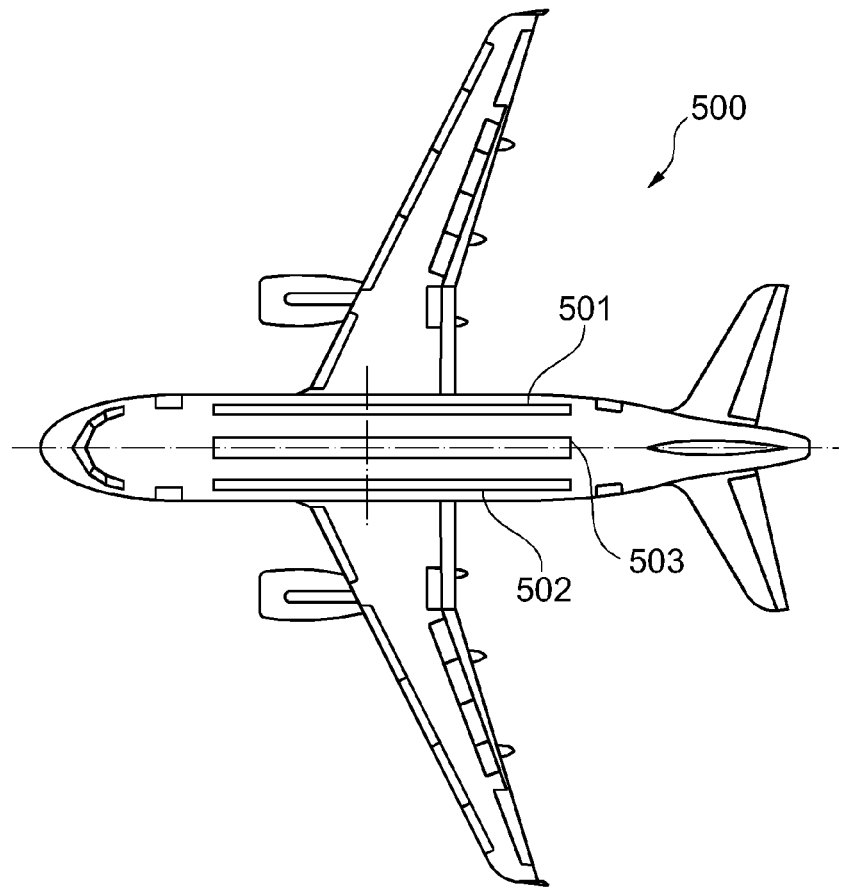
Fig. 5

STOWAGE COMPARTMENT WITH SPACE-SAVING OPENING MECHANISM

CROSS-REFERENCE TO RELATED APPLICATIONS

This application claims the benefit of the filing date of German Patent Application No. 102009014605.9 filed on Mar. 24, 2009 and of U.S. Provisional Patent Application No. 61/162,793 on Mar. 24, 2009, the disclosure of which applications is hereby incorporated herein by reference.

TECHNICAL FIELD

The invention pertains to interior furnishings in aircraft cabins. The invention particularly pertains to a stowage compartment for being arranged in an overhead area of a passenger cabin, to the utilization of a stowage compartment in an aircraft, as well as to an aircraft with such a stowage compartment.

BACKGROUND

Overhead stowage compartments (so-called Fixed-Bins) in aircraft are often closed by means of upwardly opening doors. In the opened state, these doors frequently protrude into the aisle. As a result, lights and air outlets may be covered. Particularly in aircraft with two aisles (Twin-Aisle aircraft) that have a relatively small cross section and feature centrally arranged luggage compartments (Center-Bins) in addition to the lateral luggage compartments, this may lead to space problems or to large areas of the ceiling being covered if the doors of the lateral bins and the center bins are opened simultaneously because the door may open in the direction of the user and the user may have to duck his head or step back, which is very difficult or even impossible in the confined space situation.

In order to avoid such situations, pivoted stowage compartments can be installed in the overhead area. These stowage compartments do not feature a door, but rather are entirely pivoted into the ceiling area when a piece of luggage is placed therein or removed there from. Due to the mechanical elements and bearings, however, these pivoted luggage stowage compartments may be relatively heavy, complicated with respect to their manufacture and maintenance and therefore comparatively expensive. Furthermore, these pivoted luggage stowage compartments may have a smaller volume for accommodating pieces of luggage than fixed luggage stowage compartments.

DE 10 2007 030 331 A1 and WO 2009/003945 A1 disclose stowage compartment modules for an interior of an aircraft that feature a receptacle and a housing for accommodating the receptacle. The receptacle can be pivoted downward in order to expose the opening of the stowage compartment.

The feature that the receptacle can be pivoted upward into the housing (and therefore into the area of the cabin ceiling) may have the effect that the stowage compartment volume is limited in comparison with Fixed-Bins.

SUMMARY

A stowage compartment for being arranged in an overhead area of a passenger cabin of an aircraft, the utilization of a stowage compartment in an aircraft and an aircraft. The described exemplary embodiments likewise pertain to the stowage compartment, the utilization and the aircraft. In other words, characteristics described below, for example, with reference to the stowage compartment can also be implemented in the utilization and in the aircraft and vice versa. This may provide for an improved cabin configuration that is characterized in user-friendliness and superior utilization of the space in the passenger cabin.

According to one exemplary embodiment of the invention, a stowage compartment for being arranged in an overhead area of a passenger cabin of an aircraft is disclosed, wherein said stowage compartment features a base body for stowing pieces of luggage and a closing device. The base body has an opening for placing pieces of luggage into the base body and the closing device is designed for exposing and for closing the opening of the base body. The opening and/or closing are realized in the form of a displacement of the closing device at least in the area of the opening. A hinge mechanism, by means of which the closing device (stowage compartment door) is pivoted outward, may be avoided in this fashion.

The stowage compartment may be characterized by an opening mechanism that is optimized with respect to its use and space requirement, wherein this has particularly advantageous effects on overhead stowage compartments in small aircraft. It may therefore be avoided that the closing devices (doors) of the stowage compartments protrude into the aisle in the opened state and thusly cover lights and/or air outlets.

According to another exemplary embodiment of the invention, the closing device features several sliding segments. The different sliding segments can be arranged, for example, adjacent to one another in a row similar to a roller shutter and therefore turned relative to one another. However, the closing device may also feature a single flat element with a corresponding flexibility such that it can be bent.

According to another exemplary embodiment of the invention, the closing device is realized in the form of a roller shutter.

According to another exemplary embodiment of the invention, the displacement of the closing device in the region of the opening takes place in the horizontal direction.

The term "horizontal direction" refers to a direction along the longitudinal axis of the aircraft if the stowage compartment is installed in the longitudinal direction of the aircraft (such as, for example, the stowage compartments 407, 408, 409 in FIG. 1).

According to another exemplary embodiment of the invention, the displacement of the closing device in the region of the opening takes place in the vertical direction.

The term "vertical direction" refers to the vertical axis of the stowage compartment (see axis 110 in FIG. 2A). The longitudinal axis is illustrated in FIG. 2B (see reference symbol 111).

According to another exemplary embodiment of the invention, the stowage compartment furthermore features a rolling device for rolling up the closing device during the displacement of the closing device in order to expose the opening.

The rolling device is realized, for example, in the form of a roll with a spring. The spring serves for supporting the process of rolling up the closing device. For example, the spring is prestressed when the closing device is unrolled such that it can subsequently support the rolling-up process.

According to another exemplary embodiment of the invention, the stowage compartment features a guide for guiding the closing device during the displacement of the closing device. This may make it possible to prevent the closing device from separating from the stowage compartment.

According to another exemplary embodiment of the invention, the stowage compartment is dimensioned in such a way that it does not protrude over the width of a group of seats situated there under in the installed state of the stowage compartment, namely even if the opening is exposed. Consequently, the aisle area may always remain clear, namely even when the stowage compartment is opened.

According to another exemplary embodiment of the invention, the utilization of the stowage compartment described above and below in an aircraft is disclosed. The aircraft consists, for example, of a long-range aircraft, a short-range aircraft, a helicopter or, e.g., an airship.

According to another exemplary embodiment of the invention, an aircraft is disclosed that features a passenger cabin with two aisles arranged in the longitudinal direction of the aircraft, as well as an arrangement of stowage compartments described above and below. The aircraft may also feature only one aisle.

According to another exemplary embodiment of the invention, the arrangement of stowage compartments features a first, a second and a third row of stowage compartment that are arranged in the longitudinal direction of the aircraft. The first row of stowage compartments and the third row of stowage compartments are respectively spaced apart from the second row of stowage compartments by a distance between approximately 63.5 cm (25 inches) and approximately 50.8 cm (20 inches). The second row has a center row.

According to another exemplary embodiment of the invention, the second row of stowage compartments is arranged in the center of the passenger cabin, wherein the second row features stowage compartments that are designed for being used on both sides in the passenger cabin. These stowage compartments feature two base bodies (luggage compartments). In addition, a first opening is provided for loading the first luggage compartment and a second opening is provided for loading the second luggage compartment. The two luggage compartments are separated by a partition wall and the two openings lie opposite of one another. For example, the two luggage compartments differ from one another with respect to their shape and/or orientation.

According to another exemplary embodiment of the invention, the first row of stowage compartments is arranged on the port side of the passenger cabin and the third row of stowage compartments is arranged on the starboard side of the passenger cabin.

BRIEF DESCRIPTION OF THE DRAWINGS

The present invention will hereinafter be described in conjunction with the following drawing figures, wherein like numerals denote like elements, and FIG. 1A shows a cross-sectional representation of an aircraft cabin;

FIG. 1B shows a cross-sectional representation of another aircraft cabin;

FIG. 2A shows a cross-sectional representation of a stowage compartment according to one exemplary embodiment of the invention;

FIG. 2B shows a perspective cross-sectional representation of the stowage compartment according to FIG. 2A;

FIG. 3 shows a cross-sectional representation of a stowage compartment according to another exemplary embodiment of the invention;

FIG. 4 shows a perspective representation of a stowage compartment according to another exemplary embodiment of the invention;

FIG. 5 shows an aircraft according to one exemplary embodiment of the invention;

DETAILED DESCRIPTION

Figure 6:
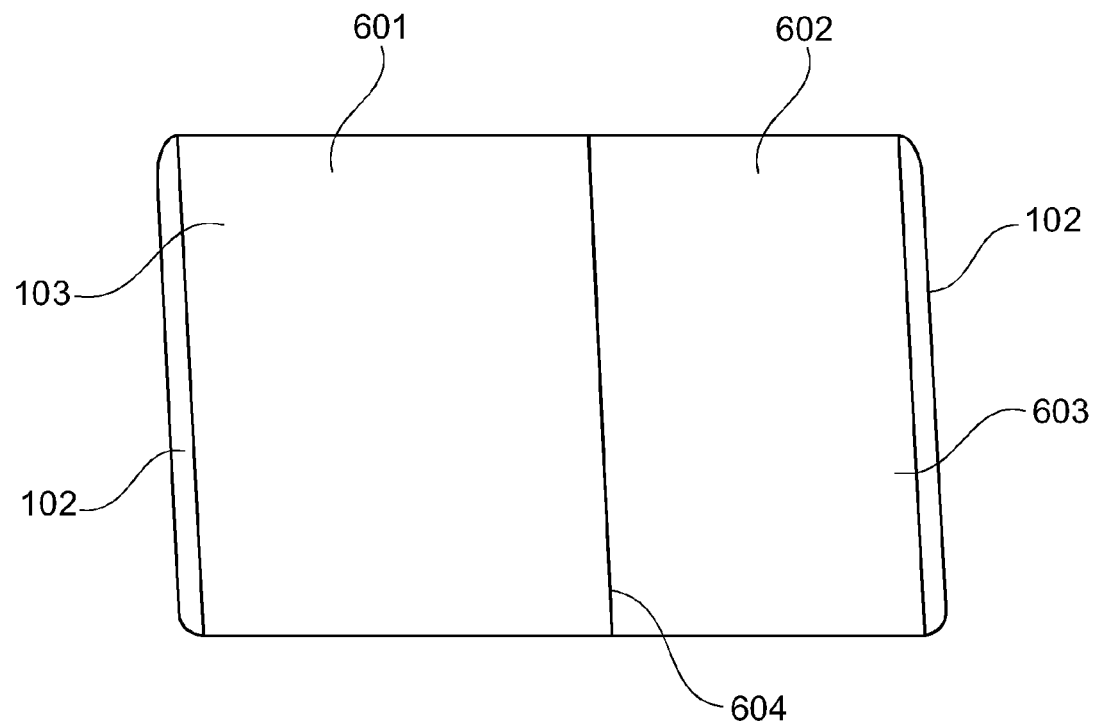
FIG. 6 shows a cross-sectional representation of a stowage compartment according to another exemplary embodiment of the invention.

The following detailed description is merely exemplary in nature and is not intended to application and uses. Furthermore, the figures show schematic representations that are not true-to-scale.

FIG. 1 shows a cross-sectional representation of a passenger cabin of an aircraft. Three sets of two seats 401, 402 and 403, 404 and 405, 406 are respectively arranged in several rows in the passenger cabin.

The respective aisle arranged between the seats 402, 403 and the seats 404, 405 has a minimum width of approximately 50.8 cm (20 inches).

A row of first stowage compartments 407 is arranged above the starboard seats 401, 402. A row of additional stowage compartments 408 is arranged above the center seats 403, 404 and a row of port side stowage compartments 409 is arranged above the port side seats 405, 406.

The stowage compartments 407, 408, 409 are rigidly installed and feature doors 410, 411 that can be pivoted upward into the aisle in order to open the stowage compartments.

In the opened state, the doors 410, 411 protrude into the aisle. Lights and air outlets may be covered in this way. Particularly in Twin-Aisle aircraft with a small cross section (as shown in FIG. 1A) and additional central or center luggage compartments (Center-Bins), this may lead to space problems and/or collisions if the doors of the lateral bins and the center bins are moved or opened simultaneously. Particularly in such an aircraft configuration, maximum use is made of the available space in order to provide sufficient stowage space despite the reduced space requirement. The overhead stowage compartments extend as close as possible to the aisle in this case. According to approval regulations, the minimum aisle width up to a height of approximately 182.9 cm (72 inches) amounts to approximately 50.8 cm (20 inches). Consequently, overhead stowage compartments also need to be spaced apart by this distance if their bottom edge lies below approximately 182.9 cm (72 inches). At a luggage height of at least approximately 30.48 cm (12 inches), this leads to an overlap of the opened doors 410, 411.

When the ceiling is covered, it may be inevitable that the cabin lighting is also covered. It may therefore be necessary to install additional lighting in the overhead stowage compartment. Depending on the position of the aisle relative to the door, the passenger needs to step back or tilt the head sideways when he opens the door because it opens in the direction of the user.

FIG. 1B shows a cross section through a second aircraft cabin with rows of stowage compartments 407, 409 on the port side and the starboard side. This is a so-called Single-Aisle configuration of the cabin with only one aisle between the individual groups of seats.

In this case, the opened door 410 also covers lighting elements and/or ventilation elements in the opened state.

It is furthermore possible that the doors of known overhead stowage compartments as they are used, for example, in short-range aircraft may be scratched or soiled from inside by luggage such that the scratching or soiling is visible in the opened state. Furthermore, the entire surface of the opening is exposed when the door is opened such that objects can easily fall out.

FIG. 2A shows a cross-sectional representation of a stowage compartment according to one exemplary embodiment of the invention. The stowage compartment is designed for being arranged on an overhead area of the passenger cabin and features a base body 101 for stowing pieces of luggage, as well as a closing device 102. The closing device 102 consists of several segments 104, 105 that are arranged adjacent to one another in a row similar to a roller shutter. The "roller shutter-like" closure device 102 of the opening 103 of the stowage compartment can be rolled up on a rolling device 106. The rolling device 106 features a spring element or a spring device 109 that can support the rolling-up process and is prestressed accordingly during the unrolling process.

During the rolling-up process, the closing device 102 is moved in the vertical direction 110 in the area of the opening and then rolled up on the rolling device 106.

FIG. 2B shows the stowage compartment of FIG. 2A in the form of a perspective representation. The arrow 111 designates the longitudinal axis of the stowage compartment that lies parallel to the longitudinal axis of the aircraft in the installed state.

The reference symbol 112 designates the surface contour of the so-called "lining," i.e., of the wall and ceiling covering of the cabin. According to the figures, the stowage compartment 100 is integrated into the lining.

FIG. 3 shows a cross-sectional representation of a stowage compartment according to another exemplary embodiment of the invention. In this exemplary embodiment, the closing device 102 is not rolled up on a rolling device 106, but rather pushed rearward along the surface of the base body 101 with the aid of two guides 107, 108 when the closing device is opened.

The closing device furthermore features on its lower edge a lug 411 of sorts that can be taken hold of by the user in order to operate the closing device. When the device is closed, this lug 411 abuts on a corresponding edge 412 in the bottom of the base body 101.

FIG. 4 shows a stowage compartment 100 according to another exemplary embodiment of the invention, in which the closing device 102 can be vertically moved back and forward along the axis. When the stowage compartment is opened, the closing device 102 is moved toward the right and rearward along the curved surface of the base body 101 on the right side 412 thereof, wherein the closing device furthermore moves, if applicable, along the rear side 413 of the base body 101.

The stowage compartment may also be realized "symmetrically" such that the closing device 102 can be opened by being selectively pushed around the stowage compartment toward the right or toward the left.

One crucial aspect of the invention is that the closing device is pushed open or rolled up. This makes it possible to optimize the architecture of the aircraft, for example, because the opening of the opening device does not cause any lighting elements to be covered.

Conventional doors of overhead stowage compartments consequently are replaced with roller shutters or sliding segments. These may be realized horizontally or vertically and transfer the roller shutter into its opened position by rolling up or flatly displacing the roller shutter within a slot plate. The opening and closing of the roller shutter is realized with a rail guide or a slotted guide 107, 108.

FIG. 6 shows a cross-sectional representation of a stowage compartment according to another exemplary embodiment of the invention. In this exemplary embodiment, the stowage compartment features a base body with two openings 103, 603. Each of the two opposite openings 103, 603 is closed with its own closing device 102. The closing device may consist of a horizontally or vertically movable closing device according to FIG. 2 to FIG. 4.

The stowage compartment shown in FIG. 6 is designed for being arranged in a center region of the aircraft cabin and can be used from both sides. This means that passengers in the left aisle have access to the first luggage compartment 601 and passengers in the right aisle have access to the second luggage compartments 602.

The two luggage compartments may differ from one another with respect to their shape and/or orientation and are separated from one another by a wall 604.

FIG. 5 shows an aircraft 500 according to one exemplary embodiment of the invention. The aircraft 500 is realized, for example, in the form of a Twin-Aisle aircraft with two aisles and features a left row of stowage compartments 502, a right row of stowage compartments 501 and a center row of stowage compartments 503. The center row of stowage compartments 503 features, for example, the stowage compartments according to FIG. 6 and the lateral rows of stowage compartments 501, 502 feature, for example, the stowage compartments according to FIG. 2A, FIG. 2B, according to FIG. 3 and/or according to FIG. 4.

The closing of the overhead stowage compartments with roller shutters or sliding segments does not impair the lighting and the air-conditioning of the aircraft. In addition, a homogenous appearance of the ceiling panels is achieved, namely regardless of the fact whether the stowage compartments are opened or closed. No collisions can occur between the doors in the opened state, namely even at small distances between the lateral bins and the center bins. The rear side of the roller shutters that may possibly be scratched or soiled by luggage is not visible in the opened state. When the roller shutter is opened, the surface of the opening is only slowly exposed such that it is easier to prevent objects from falling out. The roller shutter does not open toward the user and therefore does not require the user to step back or duck his head.

Figure 7:
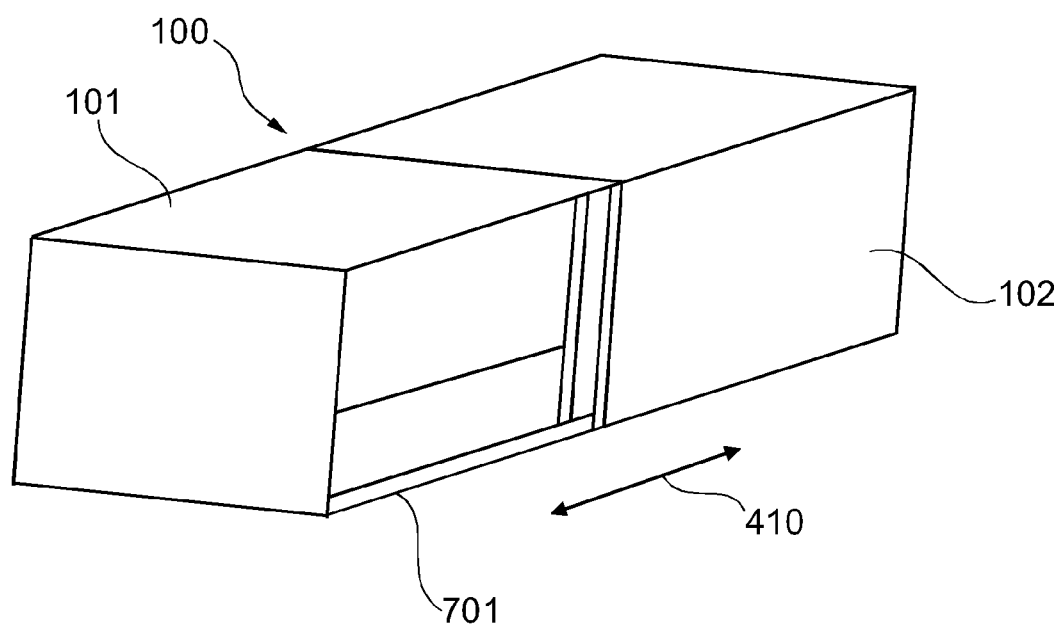
FIG. 7 shows a perspective cross-sectional representation of a stowage compartment according to another exemplary embodiment of the invention.

FIG. 7 shows a perspective cross-sectional representation of a stowage compartment 100 according to another exemplary embodiment of the invention. The closing device 102 in the form of a one-piece cover (one-piece door) is realized as a sliding closure. The plate-like cover moves in the horizontal direction 410 similar to a sliding door in a guide rail 701 provided for this purpose.

Figure 8:
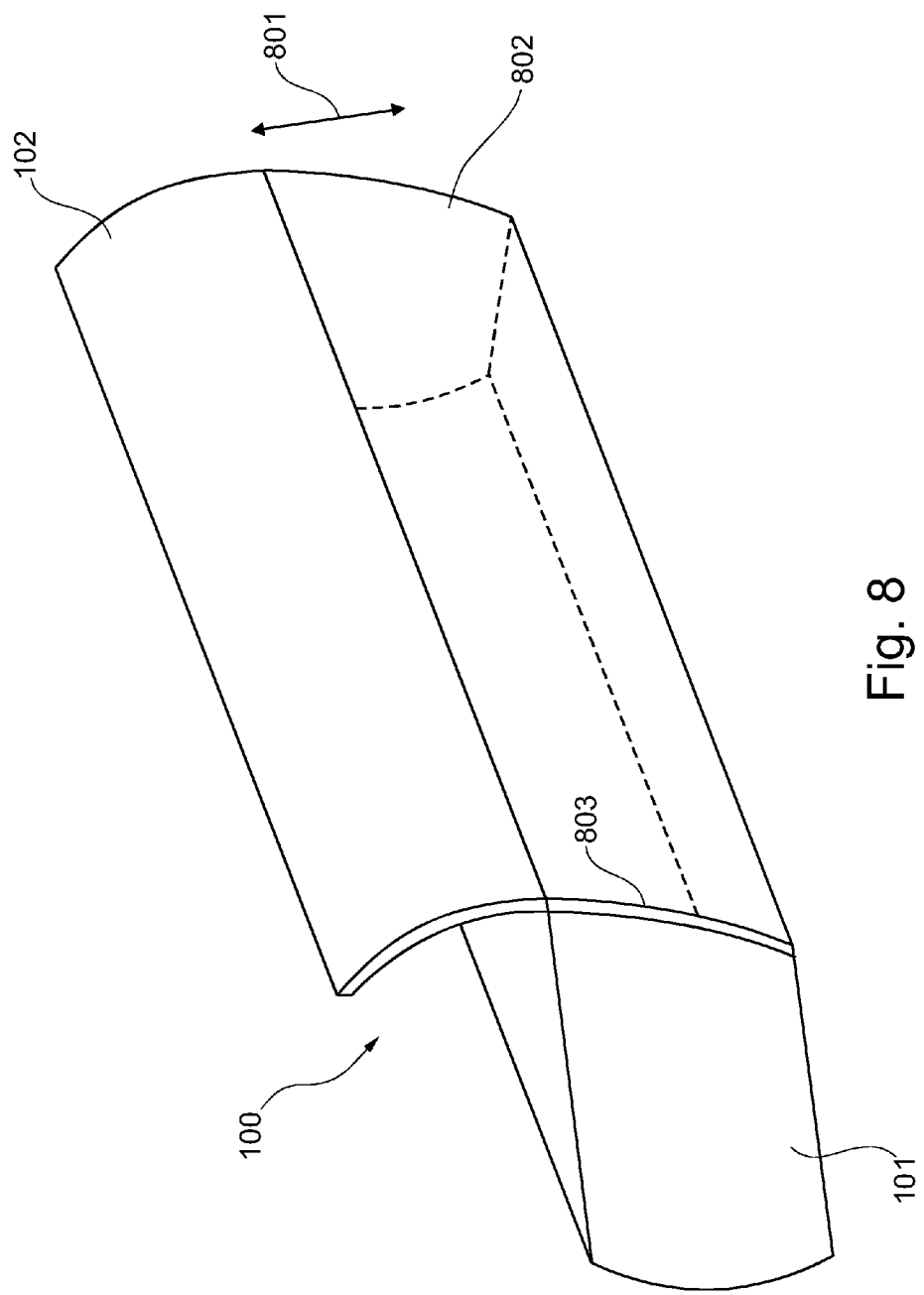
FIG. 8 shows a perspective cross-sectional representation of a stowage compartment according to another exemplary embodiment of the invention.

FIG. 8 shows a perspective cross-sectional representation of a stowage compartment 100 according to another exemplary embodiment of the invention, in which the closing device 102 is realized in the form of a one-piece cover analogous to the stowage compartment according to FIG. 7. The closing device 102 can be pushed up and down in the vertical direction 801. Laterally arranged guide rails 802, 803 may be provided in order to guide the cover.

As a supplement, it should be noted that "comprising" and "featuring" do not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments.

Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A stowage compartment of an overhead area of a passenger cabin of an aircraft, the stowage compartment comprising:
 a base body having an interior defining a storage space that is adapted to stow luggage, the base body comprising an opening for placing luggage into the base body;
 a closing device that is movable to open and close the opening of the base body with a displacement of the closing device in a region of the opening, the closing device including a plurality of sliding segments;
 a rolling device externally coupled to the base body and arranged outside of the storage space, and the rolling device including a roll on which the closing device is rolled up during the displacement of the closing device to expose the opening; and
 wherein the passenger cabin comprises a lining which defines both a wall and ceiling of the passenger cabin, said storage compartment being integrated into the lining, and the stowage compartment is elevated above a floor of the passenger cabin.

2. The stowage compartment of claim 1, wherein the closing device is a roller shutter.

3. The stowage compartment of claim 1, wherein the displacement of the closing device in the region of the opening takes place in a horizontal direction.

4. The stowage compartment of claim 1, wherein the displacement of the closing device in the region of the opening takes place in a vertical direction.

5. The stowage compartment of claim 1, wherein the rolling device comprises a roll with a spring that is designed for supporting a process of rolling up the closing device.

6. The stowage compartment of claim 1, furthermore comprising a guide that is adapted to guide the closing device during the displacement of the closing device.

7. The stowage compartment of claim 1, wherein the stowage compartment does not protrude over a width of a group of seats situated there under in an installed state of the stowage compartment even if the opening is exposed.

8. An aircraft comprising,
 a passenger cabin with at least one aisle that is arranged in a longitudinal direction of the aircraft;
 an arrangement of stowage compartments, each stowage compartment of the arrangement of stowage compartments arranged in an overhead area of the passenger cabin of the aircraft, with each stowage compartment comprising:
  a base body having an interior defining a storage space that is adapted to stow luggage, the base body comprising an opening for placing luggage into the base body;
  a closing device including a plurality of sliding segments that are movable about a rolling device to open and close the opening of the base body with a displacement of the closing device in a region of the opening; and
  the rolling device externally coupled to the base body and arranged outside of the storage space, the rolling device including a roll on which the closing device is rolled up during the displacement of the closing device to expose the opening.

9. The aircraft of claim 8,
 wherein the arrangement comprises a first row, a second row, and a third row of stowage compartments that are arranged in the longitudinal direction;
 wherein the first row of stowage compartments and the third row of stowage compartments are respectively spaced apart from the second row of stowage compartments by a distance between approximately 63.5 cm (25") and approximately 50.8 cm (20").

10. The aircraft of claim 9,
 wherein the second row of stowage compartments is arranged in a center of the passenger cabin; and
 wherein the second row of stowage compartments can be accessed from both sides.

11. The aircraft of claim 9,
 wherein the first row of stowage compartments is arranged on a port side of the passenger cabin; and
 wherein the third row of stowage compartments is arranged on a starboard side of the passenger cabin.

12. The aircraft of claim 8, wherein the closing device is a roller shutter.

13. The aircraft of claim 8, wherein the displacement of the closing device in the region of the opening takes place in a horizontal direction.

14. The aircraft of claim 8, wherein the displacement of the closing device in the region of the opening takes place in a vertical direction.

15. The aircraft of claim 8, wherein the rolling device comprises a roll with a spring that is designed for supporting a process of rolling up the closing device.

16. The aircraft of claim 8, furthermore comprising a guide that is adapted to guide the closing device during the displacement of the closing device.

* * * * *